Patented Apr. 7, 1936

2,036,526

UNITED STATES PATENT OFFICE

2,036,526

ENVELOPE FOR GAS CELLS

Max Hagedorn and Adolf Jung, Dessau in Anhalt, Germany, assignors to I. G. Farbenindustrie Aktiengesellschaft, Frankfort-on-the-Main, Germany No Drawing. Application April 20, 1931, Serial No. 531,616. In Germany April 22, 1930

6 Claims. (Cl. 91—68)

The present invention relates to gas tight balloon envelopes which are cheap to produce and have outstanding good qualities.

Processes are known for rendering a balloonet material intended for airship construction gas tight by means of the so-called goldbeater's skin, if required, with simultaneous use of colloid coatings. This method of preparing gas chamber material is complicated and costly. It is also known to tighten the gas cell material by coating it with solutions of cellulose derivatives or caoutchouc, but a really satisfying tightness is thereby not obtained.

According to this invention, excellent gas tight material for gas cells can be prepared in a simple manner from one or several layers of cellulose derivatives soluble in organic solvents and highly polymeric albuminous compounds. The new material, therefore, consists of a mixture of colloids insoluble in water and colloids capable of swelling in water or soluble therein. The presence of the colloid capable of swelling in water has proved to be particularly favorable for the impermeability of the envelope.

There can be incorporated within the colloidal material additions of softening agents, natural and artificial resins, filling materials, coloring agents of any kind, materials for reducing the combustibility etc. Suitable softening agents are any substances that are used for the preparation of plastic masses from cellulose derivatives and artificial resins.

As cellulose derivatives any of the known cellulose esters and ethers soluble in organic solvents can be used, for instance, cellulose acetate, cellulose acetate butyrate, cellulose laurate, cellulose butyrate laurate, ethyl cellulose laurate, ethyl cellulose, benzyl cellulose, hydroxy-alkyl celluloses and the esters thereof, etc. As albuminous compounds preferably gelatin, glue and casein are employed. The quantitative proportion between cellulose derivatives and albuminous substances in the preparation may vary within rather wide limits. The material will, in general, mostly consist of cellulose derivatives in order to attain a higher tenacity.

For small gas cells, particularly for meteorological sounding balloons etc. it will suffice that the envelope consists only of one or of several layers of cellulose derivatives and highly polymerized albuminous compounds. For large gas cells, especially for aircraft, however, the mechanical resistance of such a material would be too small. The layers are, therefore, united with textile webs by coating the latter with the said substances.

The coating may consist of a single layer, of several layers of the same kind or of several layers of a different kind. In the two cases, where the cellulose derivative and the albuminous compound are used in mixture, a softening agent has to be added in order to smoothly dissolve both constituents. When the coating is composed of several layers of different constitution, the cellulose derivatives and the albuminous compounds may be applied in separate layers. Several cellulose derivatives and albuminous compounds differing from one another may, at the same time, be used for one coating.

The web may be coated with the liquid colloid solution or the colloid solution may first be made into a foil and this foil stuck onto the web after drying, the surface of the foil being again softened either by heating it, or by treating it with a solvent or a swelling agent. For the preparation of impervious coatings composed of several layers, these two processes can also be combined, either by first applying a foil onto the web and then applying a further layer consisting of a colloid solution, or by first coating the web with a colloid solution and, after complete or partial drying of the coating thus prepared, applying a further layer in the form of a solid foil. The web can thus be provided on one or both sides with an impervious coating. Several webs which have been thus coated can also be superposed and combined.

The following example illustrates the invention:—

45 grams of cellulose acetate are dissolved in 255 cc. of a mixture prepared from 9 parts of acetone, 1 part of ethanol and 1 part of benzene. To this solution are added 40 cc. of acetalglycerin having a boiling point of 185 to 200° C. and forming a viscous liquid (condensation product from acetaldehyde and glycerin), cf. Journ. Soc. Chem. Ind., 1930, page 1069, and 23 cc. of a 0.5% solution of gelatin in a mixture consisting of 2 parts of water, 1 part of methanol and 1 part of acetone. The solution thus prepared is made into a thin film of a thickness of about 80 $\mu$. After drying, this film is softened on its surface with acetone and applied onto the balloon envelope fabric with application of pressure. The solution may also directly be applied on the web without preparing a film. But a larger quantity of the solution is then generally required, for obtaining the same gas-tightness than according to the process first described.

The thickness and the weight of the web and the thickness of the colloid coating may vary within wide limits. The tissue provided with a coating must generally have a square meter weight of 100–180 grams, about 50 grams being the weight of the material, the remainder that of the colloid coating. The thickness of the colloid coating can approximately be estimated by its square meter weight, each gram of square meter weight corresponding to a thickness of about 1 $\mu$.

A thin film prepared in the above described manner, is coated with a 10% solution of gelatin in aqueous acetone, to which 30% of glycerin has been added. After the coating has dried, another film of the above described kind or an ordinary cellulose acetate foil is applied. The foil thus prepared composed of several layers, is united with the web in the usual manner. When preparing coatings of several layers, the thickness of the single layers may, of course, be smaller than in a colloid coating of only one layer.

Between the gelatin layer and the second cellulose acetate foil there can be placed a layer of cotton moistened with aqueous acetone.

Corresponding quantities of glue or casein may be substituted for the gelatin.

What we claim is:—

1. In an envelope for gas balloons or balloonets a layer consisting of a homogeneous mixture of an organic cellulose derivative soluble in organic solvents and a compound selected from the group consisting of gelatin, glue and casein.

2. In an envelope for gas balloons or balloonets a layer consisting of a homogeneous mixture of an organic cellulose derivative soluble in organic solvents, softening agents, and a compound selected from the group consisting of gelatin, glue, and casein.

3. In an envelope for gas balloons or balloonets a layer consisting of a homogeneous mixture of an organic cellulose derivative soluble in organic solvents and a compound selected from the group consisting of gelatin, glue, and casein, said layer being coated on a fabric.

4. In an envelope for gas balloons or balloonets a plurality of layers, each layer consisting of a homogeneous mixture of an organic cellulose derivative soluble in organic solvents and a compound selected from the group consisting of gelatin, glue, and casein.

5. In an envelope for gas balloons or balloonets a layer consisting of 52.85 per cent of cellulose acetate, 47 per cent of acetal-glycerin and 0.15 per cent of gelatin.

6. In an envelope for gas balloons or balloonets a layer consisting of 52.85 per cent of cellulose acetate, 47 per cent of acetal-glycerin and 0.15 per cent of gelatin, and having a thickness of about 80 $\mu$.

MAX HAGEDORN.
ADOLF JUNG.